United States Patent
Shimano et al.

[15] 3,650,542
[45] Mar. 21, 1972

[54] MOTOR VEHICLE SAFETY DEVICE

[72] Inventors: Akira Shimano, Yokohama; Shin Maki, Tokyo; Katsuzi Ohyama, Yokohama; Hiromichi Ochiyama, Tokyo, all of Japan

[73] Assignee: Nissan Motor Company, Limited Yokohama City, Japan

[22] Filed: July 18, 1969

[21] Appl. No.: 843,067

[30] Foreign Application Priority Data

July 22, 1968 Japan..................................43/62051
Apr. 22, 1969 Japan..................................44/30738

[52] U.S. Cl..........................................................280/150 B
[51] Int. Cl..........................................................B60r 21/02
[58] Field of Search................................280/150 B; 296/84 K

[56] References Cited

UNITED STATES PATENTS 2,025,822 12/1935 Pryor....................................280/150 B
2,180,912 11/1939 Rogers....................................296/84 K

FOREIGN PATENTS OR APPLICATIONS 1,133,404 0/1956 France..................................296/84 K Primary Examiner—Benjamin Hersh
Assistant Examiner—Robert R. Song
Attorney—Robert E. Burns and Emmanuel J. Lobato

[57] ABSTRACT

A motor vehicle safety device to avoid whip-lash injuries of the vehicle occupants. The device has a stored netting which is automatically positioned in front of the occupants by trigger mechanism responsive to deceleration of a given magnitude of the motor vehicle. The netting is constructed to hold the occupant's head firmly without injury to the neck of the occupant and preclude the head from reverse or backward movement.

13 Claims, 13 Drawing Figures

Patented March 21, 1972

MOTOR VEHICLE SAFETY DEVICE

This invention relates generally to motor vehicles and more particularly to motor vehicle safety devices.

It is often experienced in driving a motor vehicle that in case of a frontal collision of the motor vehicle against another vehicle or a structure in the path of advance the vehicle occupants are violently flung forward and, in the worst case, are thrown out of the vehicle due to the strong force of enertia exerted on the occupants. This causes critical physical damage to the occupants and, thus, protection of the occupants from such injury is a matter of great concern to the automotive industry.

The use of a netting as a buffer or shock absorber for protecting the occupants of a vehicle involved in a collision is typical of the expedients which have thus far been attempted by the motor manufacturers. The netting safety device heretofore proposed is normally housed in a frame structure of the roof of the vehicle body. If a violent collision, which is actually a rapid deceleration, takes place at the front of the vehicle, the netting is immediately positioned in front of the vehicle occupants with the applied force of an explosion of explosives loaded in a suitable part of the motor vehicle. The netting is generally in an unfolded condition within the frame structure of the ceiling. This results in an increased overall height of the vehicle body to the detriment of the low styling of the vehicle. The use of explosives for initiating the netting into action sometimes jeopardizes the installation of the safety device of this type because of restrictions from local automotive regulations that prohibit the storage of hazardous materials in motor vehicles. Assuming that such difficulties could be overcome in one way or another, there still remains a problem in that, once the netting is stretched and the heads of the occupants hit the netting, then the necks of the occupants are forced backwardly sharply and quickly bent backwardly so that the occupants are subjected to an injury which is analogous to a whip-lash injury.

It is, therefore, an important object of the present invention to provide an improved safety device for protecting the occupants of a motor vehicle from injury resulting from a frontal collision of a motor vehicle. It is another object of the invention to provide a safety netting which is automatically positioned to protect the vehicle occupants and absorb the major portion of the impact energy as the head of an occupant strikes against the netting.

Another object of the invention is to provide a safety device which is actuated without resort to the employment of any hazardous actuator, such as chemical explosives.

It is still another object of the invention to provide a safety device having an improved netting that is capable of securing therein the heads of the vehicle occupants in place immediately after their heads hit the netting, whereby the occupants's necks are prohibited from being sharply bent backward.

Figure 1:
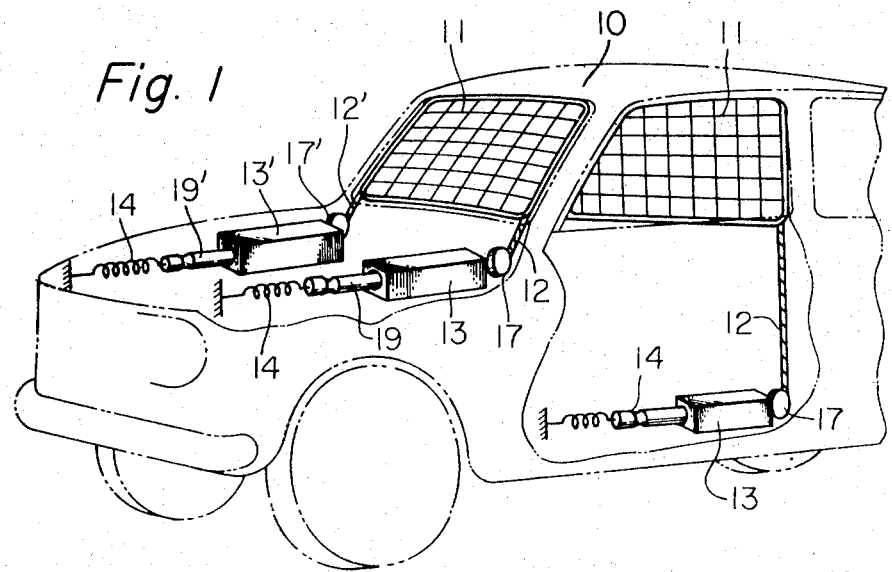
FIG. 1 is a partially cutaway view of a motor vehicle to which the device according to the invention is applied.
Figure 2:
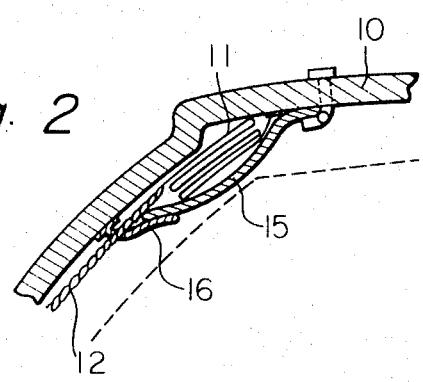
FIG. 2 is a section view of the netting in stored condition.

Referring to FIGS. 1 and 2, there is shown an example of a motor vehicle equipped with two safety devices according to the invention, one in front of the front seat and the other in front of the rear seat. Both being constructed and arranged to function essentially similarly to each other, it will suffice to refer solely to the former is the following description.

As illustrated, a safety device embodying the invention is made up of a piece of netting 11 with a hereinafter described pattern, a pair of lines 12 and 12', which may be cables, wires, or ropes, connected with the lower ends of the netting 11 and actuated by a pair of trigger mechanisms 13 and 13', and a pair of springs 14 and 14' connected to the trigger mechanisms 13 and 13', and secured to suitable mounts on the vehicle body.

The netting 11 is stored in a folded condition and snugly accommodated in a holder 15 on the ceiling 10 of the vehicle. The holder 15 has a side hingedly connected to the inside of the roof 10 of the vehicle body and has the opposite side or edge forced against the roof by means of a suitable spring 16 so that the stored netting is not released from the holder 15 in response to the usual shocks and vibrations developed or arising during operation of the vehicle. The lines 12 and 12' pull the netting 11 downwardly from the holder 15 until it is fully stretched in front of the occupants in the event of a sudden deceleration. The lines 12 and 12' are completely concealed within the frame of the vehicle or under a suitable covering. The trigger mechanisms 13 and 13' are, as will be later described, held in a locked position to keep the lines 12 and 12' slackened so that the netting 11 is maintained in a stored condition.

The springs 14 and 14' at all times bias the lines 12 and 12' in a direction for stretching the netting and positioning it in its protective position in front of the front seat occupants.

Guide wheels 17 and 17' guide the lines 12 and 12' when the safety device is actuated and the netting 11 positioned.

Figure 3:
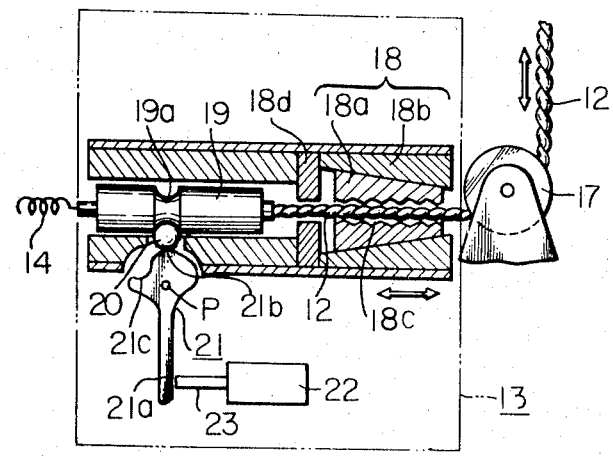
FIG. 3 is a section view of a trigger mechanism constituting part of the device show in FIG. 2.

Each of the trigger mechanisms 13 and 13' is, as best seen in FIG. 3, constituted by a one-way locking means 18 passing therethrough a line 12. A terminal rod 19 is connected at one end with the end of the line 12 and at the other end with the spring 14. Releasable lock means 20 and 21 keep the terminal rod 19 in a locked position, and a solenoid device 22 having a plunger 23 determines the relative positions of the means 20 and 21. The one-way locking means 18 is made up of inner and outer members 18a and 18b. The inner member 18a is externally configured in a conical shape converging in a direction away from the terminal rod 19 and is provided with a threaded axial bore 18c engageable with the line 12 passing therethrough. The inner conical member 18a is further provided with a wall having a slit or slits (not shown) extending throughout the length thereof to permit inward contraction of the member 18a if an outside inward force is applied thereto. This inner conical member 18a may, if desired, be made of any axially resilient material, in which case the slit or slits may be dispensed with. The outer member 18b, on the other hand, has an internal conical bore corresponding to the conical outer shape of the inner member 18a. The inner member 18a is mated with the outer member 18b in an axially slidable fashion. If, the line 12 passing through the threaded bore 18c is pulled toward the terminal rod 19, i.e., in a direction opposite to the reduced end of the inner conical member 18a, by the action of the spring 14, then the inner conical member 18a is urged in a direction in which the line 12 moves longitudinally, i.e., toward the enlarged end of the conical bore of the outer member 18b until it hits an annular stop 18d, thus permitting the line 12 to pass therethrough freely. If, on the contrary, the line 12 is pulled in a direction toward the reduced end of the conical member 18a, then the inner conical member 18a is urged in the same direction as the line 12. Due to the provision of the longitudinal slit 18c, the inner conical member 18a contracts as it moves axially within the outer conical member. The result is that the bore in the inner conical member 18a is narrowed enough to prohibit the line 12 from moving any more and accordingly the line which has moved toward the spring 14 cannot move in the reverse direction.

The terminal rod 19 has a circumferential groove 19a for engagement with the means 20. This means 20 is a steel ball having a diameter corresponding with the diameter of the groove 19a. The lock-control means 21 is mounted rotatably about its pivotal shaft P and is formed at one end as a lever 21a and at the other as an abutment 21b and has a recess 21c. While the solenoid device 22 remains deenergized, the solenoid plunger 23 is kept retracted and the lever 21a remains disengaged from the plunger 23 and, as the consequence, the lock-control means 21 assumes such a relative position that the abutment 21b is in abutting engagement with the ball 20. Thus, the ball 20 is held in mating engagement with the groove 19a so that the terminal rod 19 is prohibited from moving in an axial direction, as shown in FIG. 3. If, on the other hand, the solenoid device 22 is energized in response to a sudden deceleration of the vehicle, for example in case of a collision, the plunger 23 is actuated to hit the lever 21a. Then the lock-control means 21 is forced to rotate clockwise about its pivotal shaft P until the abutment 21b releases the ball 20 and the recess 21c receives the ball. As a result, the ball 20 is released from the groove 19a of the terminal rod 19, which therefore is permitted to move axially in a direction to pull the line 12 under the control of the tension of the spring 14. Thus, the netting 11 is moved out of the holder and positioned in a stretched condition in front of the front seat occupants in the vehicle.

Figure 4:
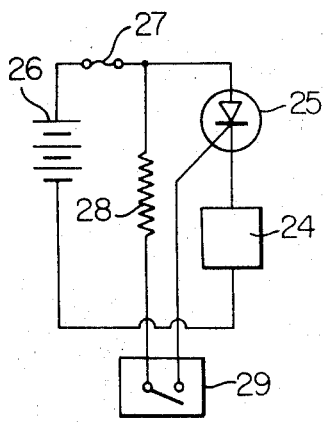
FIG. 4 is a schematic view of an electric circuit for controlling the trigger mechanism shown in FIG. 3.

The electrical circuit of the solenoid device 22 is illustrated in FIG. 4. As shown, the solenoid device 22 has an operating coil 24. As silicon-controlled rectifier 25 is connected with the operating coil 24. A power source 26 is connected in series with the operating coil 24 and the rectifier 25. A fuse 27 is connected between the rectifier 25 and the power source 26. A resistor 28 is provided for regulating the gate boltage applied to the rectifier 25. An open switch mechanism 29 senses vehicle decelerations and is closed when the deceleration is of a given magnitude resulting, for example, from a collision of the motor vehicle.

The silicon-controlled rectifier 25 is in an open position, and the circuit connecting the power source 26, fuse 27, rectifier 25, and solenoid coil 24 remains deenergized to keep the solenoid coil 24 unexcited. (The solenoid plunger 23 is thus in a retracted position). If, now, a sudden deceleration exceeding a given magnitude takes place, then the switch mechanism 29 is immediately closed to energize the entire circuit. A current flows through the gate circuit of the silicon-controlled rectifier 25 and it turns "on" to energize the solenoid coil 24, whereupon the plunger 23 is actuated and the trigger mechanism 13 actuated accordingly.

Figure 5:
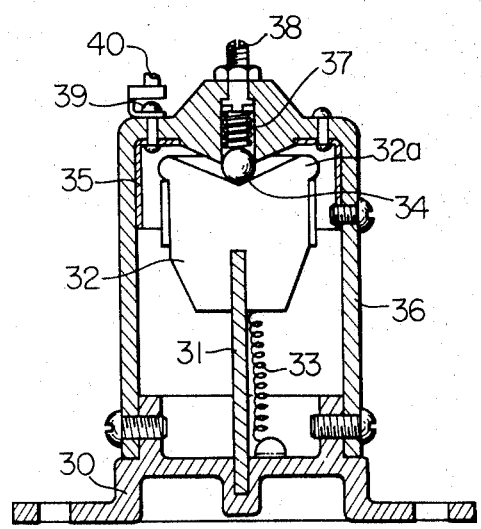
FIG. 5 is a vertical section of a switch mechanism in the trigger mechanism shown in FIG. 4.

An example of the construction of the switch mechanism 29 is illustrated in FIG. 5. As shown, the switch mechanism 29 comprises an electrically conductive base 30. An upright support rod 31 is anchored at its lowermost end to the base 30. A rockable weight 32, having on its periphery an annular projection 32a A flexible is carried by the support rod 31. A flexible conductor 33 electrically connects the base member 30 and the weight 32. A ball 34 rests on a recessed control portion of the rockable weight 32. A metal cylinder 35 surrounds the annular projection 32a of the weight 32 at a suitable space therefrom. An insulating housing 36 is mounted on the base member 30 and encloses there in the support rod 31, weight 32, flexible conductor 33, ball 34 and the metal cylinder 35. The ball 34 is forced against the rockable weight 32 by a spring 37 to maintain the alignment of the weight 32 relative to the surrounding metal cylinder 35. The force of compression of the spring 37 can be adjusted by an adjustment screw 38 provided atop the spring 37.

The base 30, rockable weight 32 and metal cylinder 35 are all made of electrically conductive material. The base 30 is electrically connected to the silicon-controlled rectifier 25, while the metal cylinder 35 is connected to the base member 30 through the weight 32. The flexible conductor 33 is connected to the power source 26 through a terminal 39 and a lead wire 40. The metal cylinder 35 is insulated from the base 30 by an insulating housing 36 and, hence, it is normally electrically disconnected from the housing 36 and accordingly from the silicon-controlled rectifier 25.

If the switch mechanism thus constructed is subjected to mechanical shocks of a given magnitude, for example, due to a collision, then the rockable weight 32 swings and strikes against the inner face of the metal cylinder 35, thereby establishing a circuit connection between the lead wire 40 and the base member 30. It, therefore, follows that a voltage is applied to the gate circuit of the silicon-controlled rectifier 25 which is consequently turned "on." The solenoid operating coil 24 is thus energized and the plunger 23 is actuated to turn the lock-control means 21 clockwise. The terminal rod 19 is then released from its locked position and is pulled axially by the spring 14 until the netting 11 is fully stretched in front of the front seat occupants of the vehicles. The line 12 once moved toward the spring 14 through the one-way locking means 18 is prohibited from moving in an opposite direction because of its tight engagement with the threaded bore of the inner conical member 18a as previously described. The line 12 and netting 11 are thus kept completely taut even after the occupant's head is violently flung onto and seized by the netting.

The netting safety device constructed as hereinbefore described can be installed also at the back of the front seat occupants to protect not only them but the rear seat occupants as illustrated in FIG. 1.

It will be appreciated that the safety device according to this invention is noted for its quick and reliable response to a sudden deceleration, such as collision, of the motor vehicle and that such a satisfactory performance of the safety device is achieved without use of any hazardous materials such as explosives and any space-taking components and parts. These outstanding advantages of the device according to the invention are intensified where it is used in combination with the improved netting according to this invention as another important phase of the invention.

Figure 6:
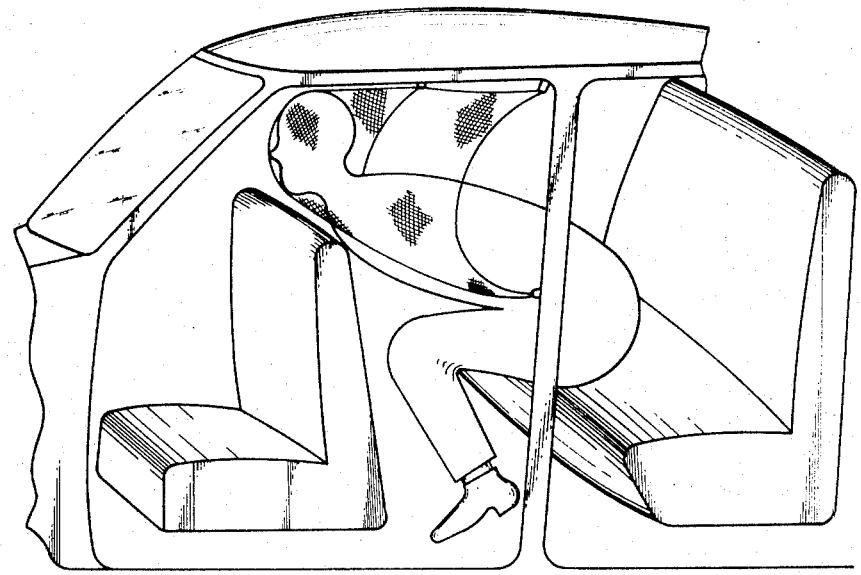
FIG. 6 is a perspective fragmentary view of a vehicle body and an occupant therein and diagrammatically illustrates the mode of operation of the netting at the time of a sudden deceleration of the motor vehicle.

The motion of a vehicle occupant subjected to a sudden deceleration is illustrated in FIG. 6. The occupant is first flung headlong onto the netting with his upper body suspended over the seat and sharply bent forward and is then caught by the netting with his face directed either forward or slightly upward. The netting, pressured by the occupant's face, is considerably bent forward with the result that the impact energy resulting from the collision of the occupant's face against the netting is absorbed to some extent. Since, however, the force of inertia must be totally borne by the occupant's head, his neck is sharply bent backward so that the occupant is liable to an injury which is analogous to a whip-lash injury.

This means that consideration should be paid to firmly capturing the occupant's head as soon as it strikes against the netting so as to protect the occupant from a serious injury. FIGS. 7 to 13 illustrate different examples of the netting suited for this purpose.

Figure 7:
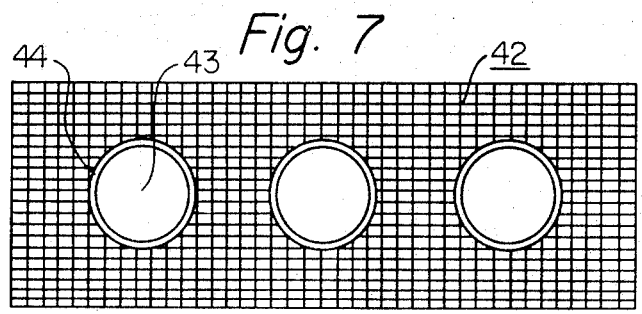
FIGS. 7 to 13 are fragmentary plan views of different forms of safety netting according to the invention.
Figure 8:
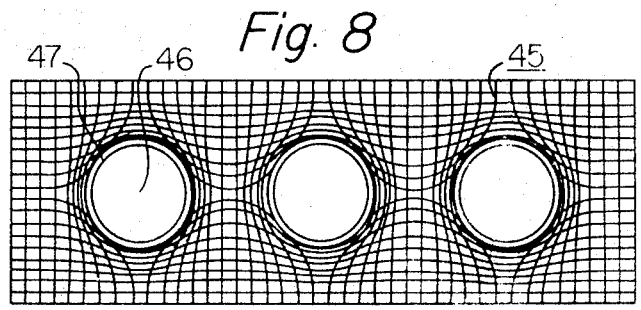

Referring to FIG. 7, there is shown a netting 42 provided with a suitable number of holes 43 which are suitably located to receive the heads of occupants of the vehicle. Each of the holes 43 is so sized that it barely admits the occupant's head and when it is forced to expand but ceases expansion once it has caught the occupant's head so as not to permit his shoulders to pass therethrough. The hole 43 may preferably be sized 100 to 130 mm. in diameter in its original state and 130 to 160 mm. in diameter in its expanded state. In order that the neck of an occupant who has been seized by the head by the netting may not be choked by the hole, the netting is made of a material which is unable to recover its original shape after the deforming force or pressure is removed. A border reinforcement 44 of the hole may preferably be tied with the warp and weft strands so as not to be broken as it is forced to expand. The border reinforcement may be strengthened with the warps and wefts passing along the boundary of the reinforcement 47, as shown in FIG. 8. The location of the holes in a fully stretched netting may be so determined as to substantially correspond to the corresponding positions of the occupants' heads. Since, however, it may happen that the occupants' heads fail to be thrown correctly into the holes, the netting is arranged, in lieu of the provision of the holes 43 therein, in such a manner that it is capable of seizing the occupants' heads anywhere through the coverage of the netting, examples of such netting being shown in FIGS. 9 to 13.

Figure 9:
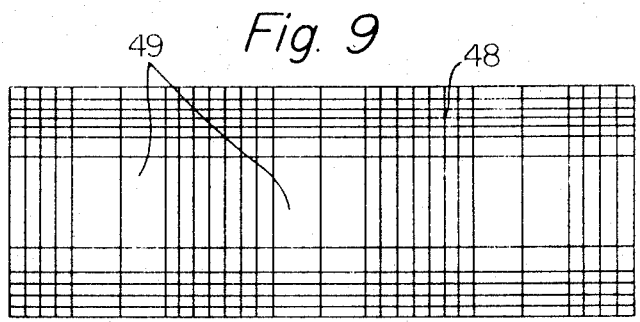
Figure 10:
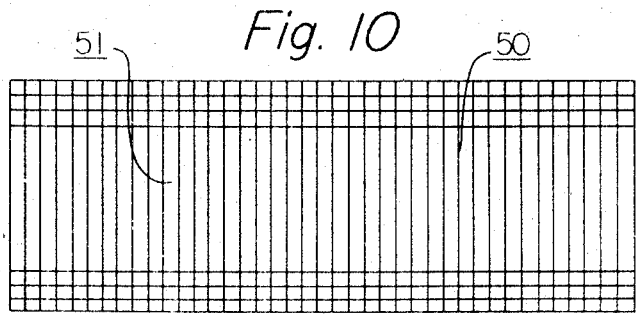
Figure 11:
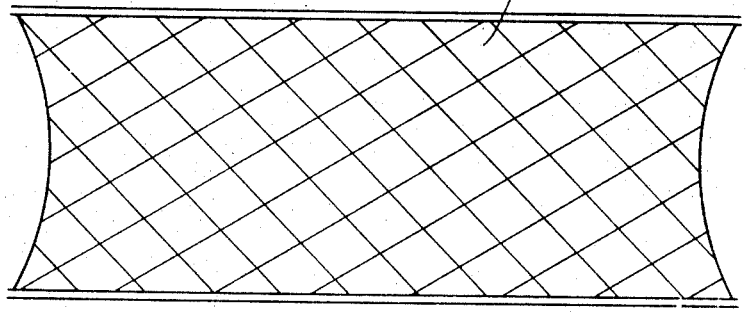
Figure 12:
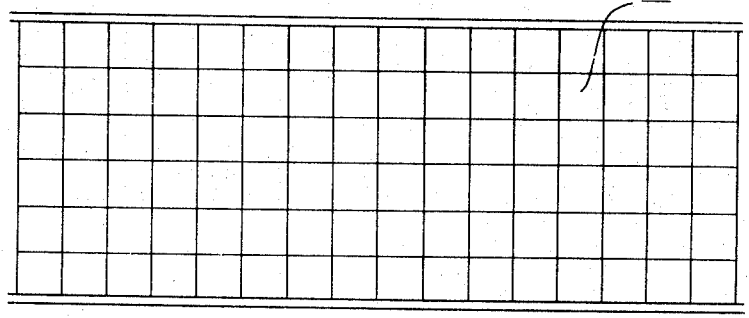
Figure 13:
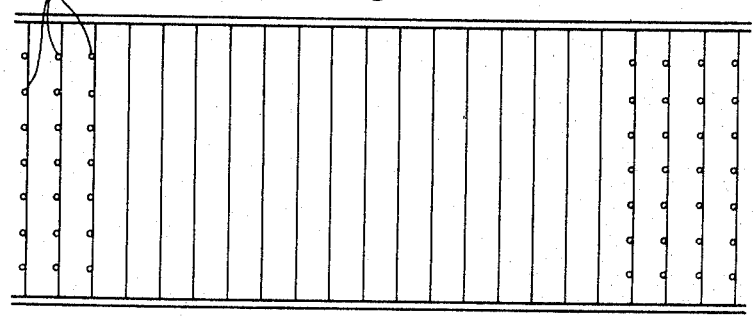

FIGS. 9 and 10 are examples of nettings 48 and 50 of which the warp and weft strands are disposed coarsely at areas 49 and 51, respectively, that are likely to receive the occupants' heads.

The nettings shown in FIGS. 7 to 10 are the examples in which the warp and weft strands are interconnected with each other at their intersections. In order to facilitate the passage of the occupants' heads through the netting when they are pressed thereto, the strands may be arranged interlaced with a coarser mesh like the nettings 51 and 11 shown in FIGS. 11 and 12, respectively. If preferred, there may be provided on each of the warps a suitable number of reasonably spaced flexible or releasable knots to facilitate the quick reception of the occupants' heads and, in this instance, the wefts may be dispensed with, as illustrated at 52 in FIG. 13.

Though not illustrated, the netting in any form should be reinforced at its entire periphery with a rope withstanding an unusually high tension so as to be protected from being torn apart when it is struck by the occupants' heads. Moreover, the netting should be stretched with sufficient tautness when it is positioned in front of the occupants so as not to be bent too deeply when it receives their heads.

We claim:

1. A safety device for protecting occupants in a motor vehicle from injury in the event of deceleration of the motor vehicle comprising, stored netting, means responsive to deceleration of a given magnitude for automatically positioning said netting in a protective position in a stretched condition to protect the occupant from injury including a whip-lash injury, said means responsive to deceleration including a line connected with said netting, a releasable trigger mechanism connected with said line and normally in a locked condition to keep said netting in a stored condition, spring connected to said trigger mechanism for moving said line to position said netting in a protective position immediately when said trigger mechanism responds to said deceleration, said trigger mechanism including a one-way locking means permitting said line to pass therethrough in a direction to position said netting in a protective position and prohibiting the line from moving in the opposite direction, a terminal rod connected at one end with said line and at the other end thereof with said spring and normally held in a locked position to keep said line slack, lock-control means for locking and releasing said terminal rod, and a solenoid device responsive to said deceleration for controlling said lock-control means.

2. A safety device according to claim 1, wherein said one-way locking means comprises an axially resilient conical inner member provided having a threaded axial bore for passing said line therethrough, and an outer member provided with a conical axial bore for axially, slidably receiving said conical inner member, whereby the line in said threaded bore of said inner member is permitted to move in a direction away from a reduced end of said conical inner member and prohibited from moving in the opposite direction due to the contraction of said inner member.

3. A safety device according to claim 1, wherein said terminal rod has a circumferential groove and in which said lock-control means comprises a ball sized to engage with said circumferential groove and a rotatably mounted lever operated by said solenoid device engaging said ball with said groove and disengaging said ball from said groove.

4. A safety device according to claim 3, wherein said solenoid device comprises a plunger for rotating said lever, a solenoid coil actuating said plunger, a silicon-controlled rectifier connected to said solenoid coil, a power source connected in series with said solenoid coil and said rectifier, and a switch mechanism connected between said rectifier and said power source and normally in an open position to keep said solenoid coil deenergized, said switch mechanism closing said switch mechanism in response to said deceleration to energize said solenoid coil, whereby said plunger actuates said lever.

5. A safety device according to claim 4, wherein said switch mechanism comprises an electrically conductive base member connected with said power source, a supporting rod anchored at one end to said base member, a rockable weight carried by said supporting rod and having on its periphery an annular projection, a flexible electrical conductor connecting said base member and said rockable weight, said rockable weight having at an end opposite to the end fixed to said supporting rod with a recess, a ball member held in said recess by a regulated spring action, a spring holding said ball in said recess and an electrically conductive cylinder surrounding said annular projection at a suitable spacing therefrom and connected with said silicon-controlled rectifier, said annular projection being disposed for hitting said metallic cylinder as said weight rocks in response to said deceleration whereby said power source is electrically connected to said silicon-controlled rectifier.

6. A safety device according to claim 1, wherein said netting comprises a number of substantially vertical strands spaced from each other to allow the occupant's to be admitted in between the strands as the occupant's head is forcibly pressed against said strands.

7. A safety device according to claim 6, wherein said netting further comprises a plurality of substantially horizontal strands spaced from each other and disposed relative to said vertical strands.

8. A safety device according to claim 7, wherein said vertical and horizontal strands are interlaced at intersections 9. A safety device according to claim 7, wherein said vertical and horizontal strands are knotted to each other at intersections.

10. A safety device for protecting a vehicle occupant from injury in the event of a collision of a vehicle comprising, a netting stored in a folded condition in a vehicle in use and extendable from said folded condition to a protective position for protecting a vehicle occupant, said netting having means for catching the head of an occupant and retaining it engaged with the netting when in said protective position thereby to avoid injury including a whip-lash injury, sensing means to sense deceleration of said vehicle during an impact, means responsive to the sensing means to automatically extend said netting and position it in said protective position, said means responsive to said sensing means comprising a line connected to said netting, a trigger mechanism having one-way locking means receiving therethrough said line for permitting said line to move therethrough in a direction to position said netting in said protective position and for prohibiting said line from moving in the opposite direction, a terminal rod connected at one end to said line, spring means connected to another end of said spring, and lock-control means operative to hold said terminal rod in a locked position for keeping said line slack and to release said terminal rod for movement together with said line by the action of said spring means, and said sensing means comprising a solenoid device sensing a sudden deceleration due to an impact for controlling the locking and releasing operations of said lock-control means.

11. A safety device for protecting a vehicle occupant from injury in the event of a collision of a vehicle comprising, a netting stored in a folded condition in a vehicle in use and extendable from said folded condition to a protective position for protecting a vehicle occupant, said netting having means for catching the head of an occupant and retaining it engaged with the netting when in said protective position thereby to avoid injury including a whip-lash injury, sensing means to sense deceleration of said vehicle during an impact, means responsive to the sensing means to automatically extend said netting and position it in said protective position, said means for catching the head of an occupant comprising strands of said netting defining an opening for receiving the head of the occupant therethrough, and reinforcement means about the boundary of said opening.

12. A safety device according to claim 11, in which said reinforcement means comprises additional strands of material closer spaced than the remainder of said netting.

13. A safety device for protecting a vehicle occupant from injury in the event of a collision of a vehicle comprising, a netting stored in a folded condition in a vehicle in use and extendable from said folded condition to a protective position for protecting a vehicle occupant, said netting having means for catching the head of an occupant and retaining it engaged with the netting when in said protective position thereby to avoid injury including a whip-lash injury, sensing means to sense deceleration of said vehicle during an impact, means responsive to the sensing means to automatically extend said netting and position it in said protective position, and said means for catching the head of an occupant comprising netting strands disposed relative to each other defining an opening in the netting for receiving and retaining the head of the occupant therein.

* * * * *

UNITED STATES PATENT OFFICE
CERTIFICATE OF CORRECTION

Patent No. 3,650,542  Dated  March 21, 1972

Inventor(s) AKIRA SHIMANO, ET AL.

It is certified that error appears in the above-identified patent and that said Letters Patent are hereby corrected as shown below:

In the "Heading to the Patent," third line [72] Inventors:" change the fourth inventor's name from "HIROMICHI OCHIYAMA" to -- HIROMICHI UCHIYAMA --.

Signed and sealed this 19th day of December 1972.

(SEAL)
Attest:

EDWARD M. FLETCHER, JR.
Attesting Officer

ROBERT GOTTSCHALK
Commissioner of Patents